United States Patent
Koyama et al.

(10) Patent No.: US 10,502,337 B2
(45) Date of Patent: Dec. 10, 2019

(54) SOLENOID VALVE

(71) Applicant: Honda Motor Co., Ltd., Tokyo (JP)

(72) Inventors: Tomoyoshi Koyama, Utsunomiya (JP);
Koji Hakoda, Shioya-gun (JP);
Tomohiko Hatakeda, Wako (JP);
Satoshi Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/440,266

(22) Filed: Feb. 23, 2017

(65) Prior Publication Data

US 2017/0248248 A1 Aug. 31, 2017

(30) Foreign Application Priority Data

Feb. 26, 2016 (JP) .................................. 2016-035665

(51) Int. Cl.
*F16K 31/06* (2006.01)
*H01F 7/16* (2006.01)

(52) U.S. Cl.
CPC ...... *F16K 31/0675* (2013.01); *F16K 31/0655* (2013.01); *H01F 7/1607* (2013.01); *H01F 7/1615* (2013.01)

(58) Field of Classification Search
CPC ............. F16K 31/0675; F16K 31/0655; H01F 7/1607; H01F 7/1615
See application file for complete search history.

(56) References Cited

U.S. PATENT DOCUMENTS

| 8,651,453 | B2 * | 2/2014 | Heyer | ..................... B60T 8/363 251/129.02 |
| 2010/0252757 | A1 * | 10/2010 | Birkelund | ........... F16K 31/0655 251/65 |
| 2014/0333398 | A1 * | 11/2014 | Nila | ........................ H01F 7/127 335/281 |
| 2017/0016552 | A1 * | 1/2017 | Schlick | ............... F16K 31/0655 |

FOREIGN PATENT DOCUMENTS

JP 2013-108573 A 6/2013

* cited by examiner

*Primary Examiner* — Ian G Paquette
(74) *Attorney, Agent, or Firm* — Westerman, Hattori, Daniels & Adrian, LLP

(57) ABSTRACT

A solenoid valve includes a body having a flow channel, and a solenoid part coupled to the body. The solenoid part includes a core housing. A movable core can be accommodated inside the core housing. A flange part of the core housing is expanded radially outwardly from a guide part which guides the movable core. Further, a thick portion is provided at a boundary portion between the flange part and the guide part on a core part side. The thick portion becomes gradually thick toward the guide part.

4 Claims, 4 Drawing Sheets

SOLENOID VALVE

CROSS-REFERENCE TO RELATED APPLICATION

This application is based upon and claims the benefit of priority from Japanese Patent Application No. 2016-035665 filed on Feb. 26, 2016, the contents of which are incorporated herein by reference.

BACKGROUND OF THE INVENTION

Field of the Invention

The present invention relates to a solenoid valve having a movable core which moves under energization of a solenoid, the solenoid valve being configured to switch a communication state of a flow channel by moving the movable core.

Description of the Related Art

It has been common to use a solenoid valve in which a solenoid part including a coil is energized to cause excitation, and thereby attract a movable core, whereby a valve plug coupled to the movable core is opened and closed to switch a communication state of a flow channel formed in a body.

For example, a solenoid valve disclosed in Japanese Laid-Open Patent Publication No. 2013-108573 has a yoke made of magnetic material, and a movable core is accommodated movably in the yoke. The yoke includes a cylindrical proximal portion, and a flange part extending radially outward from an end of the cylindrical proximal portion on the distal end side. The flange part of the yoke is provided to face a flange part of a base having a flow channel in an axial direction. The cylindrical proximal portion is provided inside a bobbin with a winding coil. The cylindrical proximal portion is coaxial with the bobbin. The coil is wound around the bobbin.

SUMMARY OF THE INVENTION

In the above solenoid valve, the flange part is provided at a right angle to the cylindrical proximal portion. Therefore, when the coil is excited by energization magnetic flux flows from the flange part having a relatively large cross sectional area to the cylindrical proximal portion having a small cross sectional area. Consequently, concentration of magnetic flux tends to occur in the vicinity of a boundary between the flange part and the cylindrical proximal portion.

For this reason, when the movable core moves inside the yoke in the axial direction, an attraction force (side force) is applied to the movable core due to concentration of magnetic flux, and this movable core is pulled in a radially outward direction perpendicular to the moving direction of the movable core. As a result, the movable core moves in a state where the attraction force is applied to the movable core in the radially outward direction. Under the circumstances, the sliding resistance between the cylindrical proximal portion and the movable core is increased, and the operational performance is degraded. Further, since the friction on the sliding surface is increased, durability is degraded undesirably.

Further, since the cylindrical proximal portion is thin in comparison with the flange part, there is a concern that the cylindrical proximal portion may be damaged or deformed even in the case where only a small force is applied from the movable core to the cylindrical proximal portion in the radially outward direction.

A general object of the present invention is to provide a solenoid valve in which it is possible to improve the operational performance and the durability by decreasing an attraction force in a direction perpendicular to a moving direction of a movable core.

A solenoid valve according to the present invention includes a body including a flow channel as a passage of fluid, a movable core provided movably relative to the body, a solenoid coupled to the body, and configured to move the movable core in an axial direction when the solenoid is excited by energization, a fixed member provided inside the solenoid, and made of magnetic material, and a valve plug provided at an end of the movable core, and configured to switch the communication state of the flow channel.

The fixed member includes a tubular guide part in which the movable core is movably accommodated, a core part extending coaxially with and continuous with the guide part, the core part being configured to attract the movable core by excitation of the solenoid, and a flange part expanded radially outwardly from the guide part, and a thick portion is provided on a boundary portion between the flange part and the guide part.

In the present invention, a fixed member made of magnetic material includes a tubular guide part and a thick portion. A movable core is accommodated movably inside the guide part. A flange part is extended radially outwardly from the guide part. A thick portion is provided on a boundary portion between the guide part and the flange part. In the excitation state of the solenoid, the flow of the magnetic flux can be guided smoothly from the flange part to the guide part through the thick portion.

Therefore, since concentration of the magnetic flux at the boundary portion between the flange part and the guide part is alleviated by the thick portion, generation of the attraction force (side force) in the radially outward direction, resulting from concentration of the magnetic flux, is suppressed, and the attraction force applied to the movable core is reduced. Therefore, it is possible to move the movable core smoothly in the axial direction. Consequently, it is possible to achieve improvement in the operational performance of the movable core. Further, since the attraction force that attracts the movable core in the radially outward direction is suppressed, the sliding resistance between the movable core and the guide part is reduced. It is possible to avoid degradation of the durability due to friction, and consequently improvement of the durability is achieved. Further, in the presence of the thick portion, it is possible to improve the strength of the area adjacent to the boundary portion between the flange part and the guide part.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
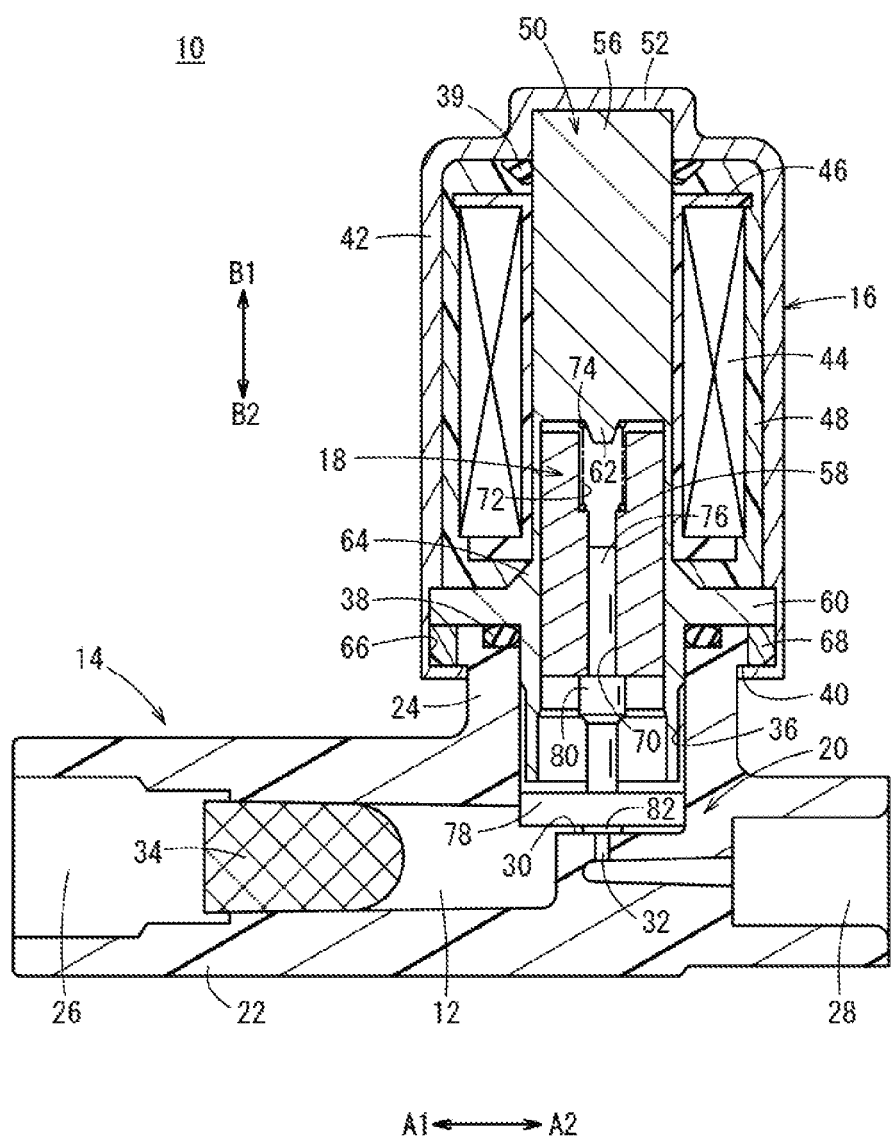
FIG. 1 is an overall cross sectional view showing a solenoid valve in a valve closed state according to an embodiment of the present invention.

As shown in FIG. 1, a solenoid valve 10 includes a body 14 having a flow channel 12 as a passage of fluid, a solenoid part (solenoid) 16 connected to the body 14 and which is excited when the solenoid part 16 is energized (when electricity is supplied to the solenoid part 16), a movable core 18 provided inside the solenoid part 16, and configured to move under the excitation, and a valve mechanism 20 connected to the movable core 18 for switching a communication state of the flow channel 12.

For example, the body 14 is made of resin material, and includes a main body 22 and an insertion part 24. The main body 22 is formed in a straight line shape, and the flow channel 12 is formed in the main body 22. The insertion part 24 protrudes from the main body 22 in a direction perpendicular to the main body 22. Further, an inlet port 26 is opened at one end of the main body 22 and fluid is supplied to the main body 22 through the inlet port 26. The inlet port 26 communicates with the flow channel 12 formed in the main body 22. Further, an outlet port 28 is opened at the other end of the main body 22. The fluid is discharged from the main body 22 through the outlet port 28.

A valve seat 30 is formed in the flow channel 12 at a position facing the insertion part 24 described later. The valve seat 30 has a planar shape formed in an axial direction (indicated by arrows A1 and A2) of the main body 22. A valve plug 78 of valve mechanism 20 described later can be seated on the valve seat 30. A connection channel 32 extends through substantially the center of the valve seat 30 in a direction (indicated by arrows B1, B2) perpendicular to the axial line of the main body 22. After the connection channel 32 extends by a predetermined distance in the direction indicated by arrow B2, the connection channel 32 further extends in the axial direction indicated by the arrow A2, and then communicates with the outlet port 28. That is, in the body 14, the inlet port 26 and the outlet port 28 are connected through the flow channel 12 and the connection channel 32.

Further, a mesh filter 34 is attached to the inside of the inlet port 26. The mesh filter 34 collects (removes) dusts, if any, in the fluid. supplied through the inlet port 26.

The insertion part 24 is formed at a position slightly shifted from the center toward the other end in the axial direction of the main body 22 indicated by the arrow A2. The insertion part 24 protrudes in perpendicular to the axial line of the main body 22 by a predetermined height. An insertion hole 36 is formed in the insertion part 24. The solenoid part 16 and the valve mechanism 20 are partially inserted into the insertion hole 36.

Further, a seal ring 38 is installed at an end of the insertion part 24 through an annular groove, and a stepped portion 40 protruding in the radially outward direction is formed in the outer circumferential portion of the insertion part 24.

The solenoid part 16 includes a tubular casing 42 having a bottom, a bobbin 46 provided in the casing 42 and around which a coil 44 is wound, a cover member 48 provided to cover the outside of the bobbin 46, and a core housing (fixed member) 50 provided inside the bobbin 46, and fixed to an end of the casing 42.

For example, the casing 42 is made of magnetic material such as cold rolled steel sheet. The casing 42 has a substantially constant diameter from one end to the other end. A cylindrical hollow projection 52 is formed at a central portion of the one end of the casing 42. The bobbin 46, the core housing 50, etc. are accommodated inside the casing 42 through the other end side the casing 42 which is opened. The opened other side is oriented toward the body 14 (in the direction indicated by the arrow B2).

For example, the cover member 48 is made of resin material, and has a cylindrical shape. The cover member 48 is formed by molding in a manner to cover the outer circumference of the bobbin 46. Specifically, one end of the cover member 48 is molded in the radially inward direction, in a manner to cover one end of the bobbin 46. Likewise, the other end of the cover member 48 is molded in the radially inward direction, in a manner cover the other end of the bobbin 46. Therefore, the bobbin 46 is covered by the cover member 48 in the state where the coil 44 is wound around the bobbin 46.

Then, both of the cover member 48 and the bobbin 46 are accommodated in the casing 42 in a state where the outer circumferential surface of the cover member 48 abuts against the inner circumferential surface of the casing 42.

Further, an annular O-ring 39 is provided between the inner edge of the one end of the cover member 48 and the casing 42. The O-ring 39 is provided as anti-vibration means for preventing vibrations caused by operation of the solenoid valve 10 from being transmitted to the solenoid part 16.

Figure 2:
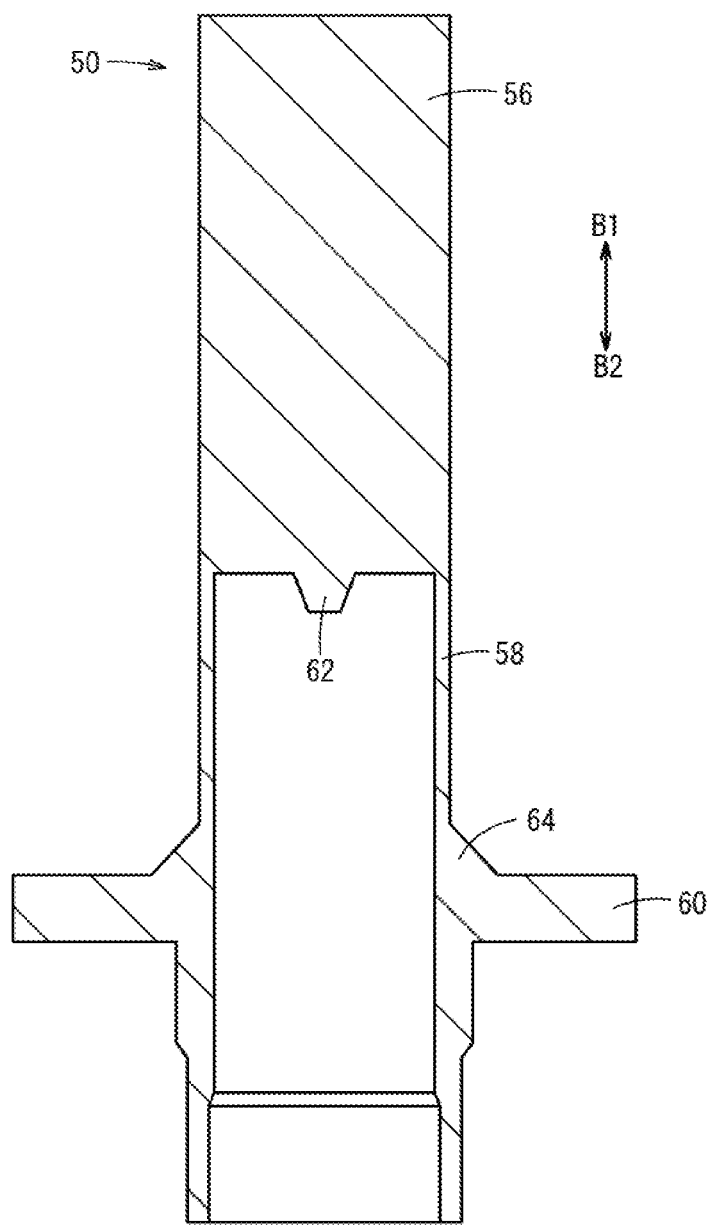
FIG. 2 is a cross sectional view showing a core housing in the solenoid valve shown in FIG. 1.

As shown in FIGS. 1 and 2, for example, the core housing 50 is made of a single magnetic material such as magnetic stainless steel. The core housing 50 includes a core part 56 formed at one end thereof in the direction indicated by the arrow B1, a tubular guide part 58 extending from an end of the core part 56 to the other end of the core housing 50 in the direction indicated by the arrow B2, and a flange part 60 expanded radially outwardly from a middle portion of the guide part 58 in the axial direction.

The core part 56 has a cylindrical shape. In the state where the core part 56 is inserted into the bobbin 46, one end of the core part 56 is inserted into the projection 52 of the casing 42. Thus, the core part 56 is fixed together with the casing 42. Further, a spring receiving protrusion 62 is formed at the center of the other end of the core part 56. The spring receiving protrusion 62 protrudes by a predetermined height. An end of a spring 74 described later is engaged with the spring receiving protrusion 62.

The guide part 58 is formed coaxially with the core part 56. The guide part 58 has a substantially constant diameter, and extends in the axial direction (indicated by the arrow B2) by a predetermined length. The movable core 18 is accommodated inside the guide part 58 in a manner that the movable core 18 is movable in the axial direction (indicated by arrows B1 and B2). Further, the other end of the guide part 58 is inserted into the insertion part 24 of the body 14. In this manner, the solenoid part 16 including the core housing 50 is fixed perpendicularly to the main body 22 of the body 14.

The flange part 60 is formed in perpendicular to the outer circumferential surface of the guide part 58. A thick portion 64 is formed on a boundary portion between the flange part 60 and the guide part 58. The thickness of the thick portion 64 is gradually increased on the side of the core part 56, i.e., increased along the direction indicated by the arrow B1.

Stated otherwise, first the flange part 60 extends with a substantially constant thickness from an outer marginal portion thereof toward the guide part 58, i.e., in the radially inward direction, and then the thickness of the flange part 60 is gradually increased as it approaches the boundary portion between the flange part 60 and the guide part 58.

For example, the thick portion 64 has a triangular shape in cross section, and is formed in an annular shape along the circumference of the flange part 60 and the guide part 58. The thick portion 64 faces the inner edge of the other end of the cover member 48.

The outer marginal portion of the flange part 60 is engaged with a groove 66 formed in the inner circumferential surface of the casing 42. Therefore, the casing 42 and the core housing 50 are positioned relative to each other in the axial direction (indicated by the arrows B1 and B2), and are arranged coaxially with each other.

Further, in the solenoid part 16, the core part 56 and the guide part 58 of the core housing 50 are partially inserted to the inside of the bobbin 46 and the cover member 48, and the flange part 60 abuts against the other end of the cover member 48. In this state, the bobbin 46, the cover member 48, and the core housing 50 are accommodated in the casing 42. Further, after the other end of the casing 42 is positioned in a manner to cover the outer circumferences of the flange part 60 and the insertion part 24, the other end of the casing 42 is folded radially inwardly, and crimped in engagement with the stepped portion 40 of the insertion part 24. Thus, the casing 42 is coupled to the insertion part 24 of the body 14.

For example, a ring 68 made of metal material such as stainless steel is provided between the outer circumferential surface of the insertion part 24 and the casing 42, and these components are crimped together.

Further, the flange part 60 abuts against a seal ring 38 provided at the insertion part 24. Thus, leakage of the fluid from the insertion hole 36 to the outside is prevented.

For example, the movable core 18 is made of magnetic material, and has a cylindrical shape. A fitting hole 70 is formed inside the movable core 18. The fitting hole 70 passes through the movable core 18 in an axial direction of the movable core 18 (indicated by the arrows B1 and B2). A large diameter spring receiving hole 72 is formed on one end side of the fitting hole 70 (in the direction indicated by the arrow B1). That is, the fitting hole 70 and the spring receiving hole 72 are formed stepwise.

The movable core 18 is accommodated inside the guide part 58 in a manner that the spring receiving hole 72 faces the core part 56 of the core housing 50. The spring 74 comprising a coil spring is inserted into the spring receiving hole 72. Then, one end of the spring 74 is engaged with the spring receiving protrusion 62 of the core part 56. Thus, the spring 74 is interposed between the core part 56 and the movable core 18. The elastic force of the spring 74 is applied to the movable core 18 in a direction away from the core part 56 indicated by the arrow B2.

The valve mechanism 20 includes a shaft 76 fixed to the center of the movable core 18, and a valve plug 78 coupled to the other end of the shaft 76.

For example, the shaft 76 is made of metal material, and has a predetermined length in the axial direction (indicated by arrows B1, B2). One end of the shaft 76 is press-fitted into the fitting hole 70 of the movable core 18. Thus, the shaft 76 is coupled integrally to the center of the movable core 18. Further, the shaft 76 includes a large-diameter portion 80 at a substantially central position thereof. The diameter of the large-diameter portion 80 is increased, radially outwardly. An end of the large-diameter portion 80 abuts against the other end of the movable core 18, and the other end of the large-diameter portion 80 is coupled to the central portion of the valve plug 78. in the structure, the shaft 76 and the valve plug 78 of the valve mechanism 20 move together when the movable core 18 moves in the axial direction.

For example, the valve plug 78 is made of metal covered with elastic material such as fluororubber. The valve plug 78 has a circular disk shape having a diameter which is larger than the outer diameter of the guide part 58. Further, the valve plug 78 is provided between the other end of the guide part 58 and the valve seat 30, inside the insertion hole 36. A seating part 82 is provided on a portion of the valve plug 78 that faces the opening of the connection channel 32. The seating part 82 is seated on the valve seat 30 to thereby close the connection channel 32. The seating part 82 is made of elastic material.

The solenoid valve 10 according to the embodiment of the present invention basically has the above structure. Next, operation and working effects of the solenoid valve 10 will be described. FIG. 1 shows a valve closed state where, in a non-excitation state in which the coil 44 is not energized, the movable core 18 is pressed by the elastic force of the spring 74 toward the body 14 in the direction indicated by the arrow B2, and the seating part 82 of the valve plug 78 is seated on the valve seat 30, whereby communication between the inlet port 26 and the outlet port 28 is blocked.

Figure 3:
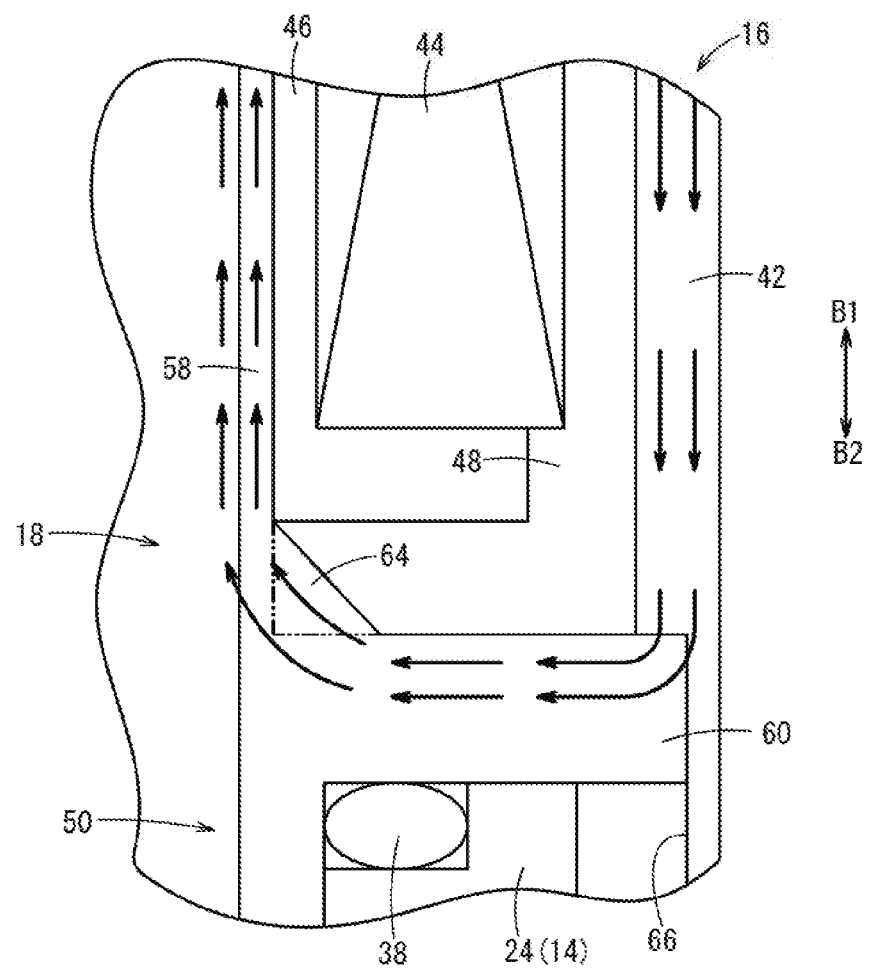
FIG. 3 is a view schematically showing flow of magnetic flux in an area adjacent to a flange part of the core housing when a solenoid part is in an excitation state.

In the valve closed state, electricity is supplied from a power supply (not shown) to the coil 44 to thereby energize and excite the coil 44. As shown in FIG. 3, circulation of the magnetic flux is generated such that the magnetic flux flows from the casing 42 of the solenoid part 16, passes through the flange part 60 of the core housing 50 to the movable core 18 and the guide part 58, further flows from the movable core 18 and the guide part 58 to the core part 56, and returns to the casing 42. By the excitation, the movable core 18 is attracted toward the core part 56 of the care housing 50.

At this time, the magnetic flux flowing from the flange part 60 to the movable core 18 and the core part 56 passes through the thick portion 64 having a thickness that is gradually increased in the flowing direction of the magnetic flux. Thus, the magnetic flux flows obliquely toward the core part 56 in the vicinity of the boundary portion between the flange part 60 and the guide part 58. Therefore, in comparison with the case where no thick portion 64 is provided in the core housing 50 (see two dot chain line pattern in FIG. 3), the magnetic flux flows smoothly in the vicinity of the boundary portion. Consequently, concentration of the magnetic flux is alleviated.

In this manner, the movable core 18 moves in a direction away from the body 14 indicated by the arrow B1, in opposition to the biasing force of the spring 74. Consequently, the seating part 82 of the valve plug 78 moves away from the valve seat 30. Thus, the connection channel 32 is opened, whereby the valve is placed in a valve opened state in which a communication blocked state by the valve plug 78 is released. As a result, the fluid which is supplied from the inlet port 26 into the flow channel 12 flows through the connection channel 32, and the fluid is discharged to the outside from the outlet port 28.

In the case of interrupting the flow of the fluid again from the valve opened state, energization of the coil 44 is stopped to place the solenoid part 16 in the non-excitation state. The attraction force by which the movable core 18 is attracted toward the core part 56 (in the direction indicated by the arrow B1) is no longer applied. Therefore, by the elastic force of the spring 74, the movable core 18 is pressed toward the body 14 in the direction indicated by the arrow B2, and as a result, the valve plug 78 is seated on the valve seat 30. Thus, as shown in FIG. 1, the valve plug 78 is seated on the valve seat 30 again, whereby the valve is placed in a valve closed state in which communication between the inlet port 26 and the outlet port 28 is blocked. Consequently, flow of the fluid between the inlet port 26 and the outlet port 28 is interrupted.

As described above, in the embodiment of the present invention, in the core housing 50 of the solenoid part 16, the thick portion 64 having a thickness increased along the axial direction is provided on the boundary portion between the flange part 60 and the guide part 58. The thick portion 64 is formed so as to gradually increase its thickness from the flange part 60 toward the guide part 58. Thus, in the excitation state of the coil 44, the magnetic flux can be made to flow smoothly from the flange part 60 to the guide part 58.

As a result, concentration of the magnetic flux in the vicinity of the boundary portion between the flange part 60 and the guide part 58 is alleviated by the thick portion 64. Therefore, generation of the attraction force (side force) on the movable core 18 in the radially outward direction, due to concentration of the magnetic flux is suppressed. Thus, it is possible to smoothly move the movable core 18 in the axial direction. Stated otherwise, it is possible to improve the thrust force of the movable core 18.

Further, the movable core 18 is prevented from being pulled in a direction perpendicular to the moving direction thereof by attraction force in the radially outward direction. Therefore, during movement of the movable core 18, sliding resistance between the guide part 58 and the movable core 18 is suppressed, and thus it is possible to avoid degradation of the durability due to friction. Consequently, it is possible to achieve improvement in the durability.

Further, by providing the thick portion 64, it is possible to improve the strength in a portion adjacent to the boundary portion between the flange part 60 and the guide part 58. Consequently, even in the case where a force is applied radially outwardly from the movable core 18 to the core housing 50, damage to or deformation of the core housing 50 is prevented.

Figure 4A:
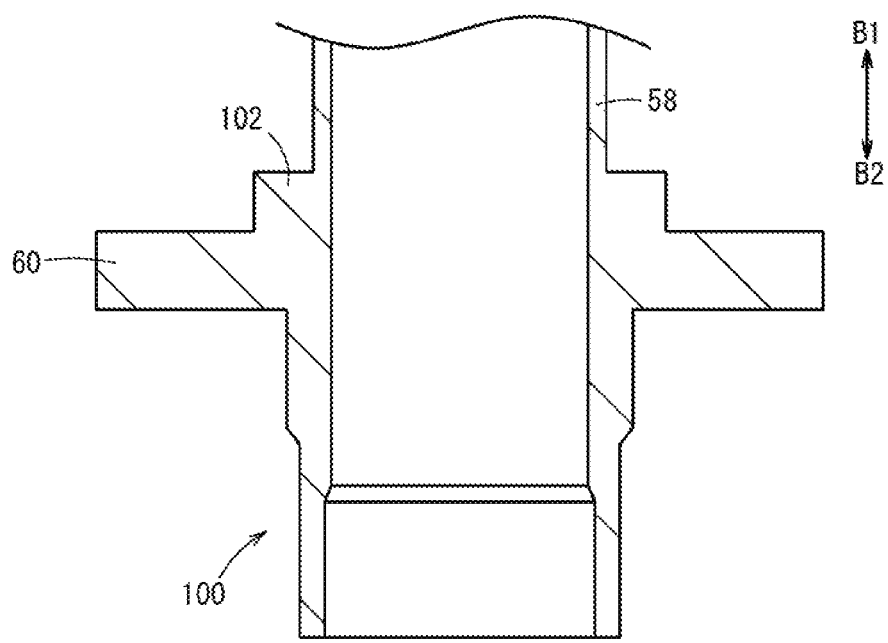
FIG. 4A is an enlarged cross sectional view showing a core housing according to a first modification of the embodiment.
Figure 4B:
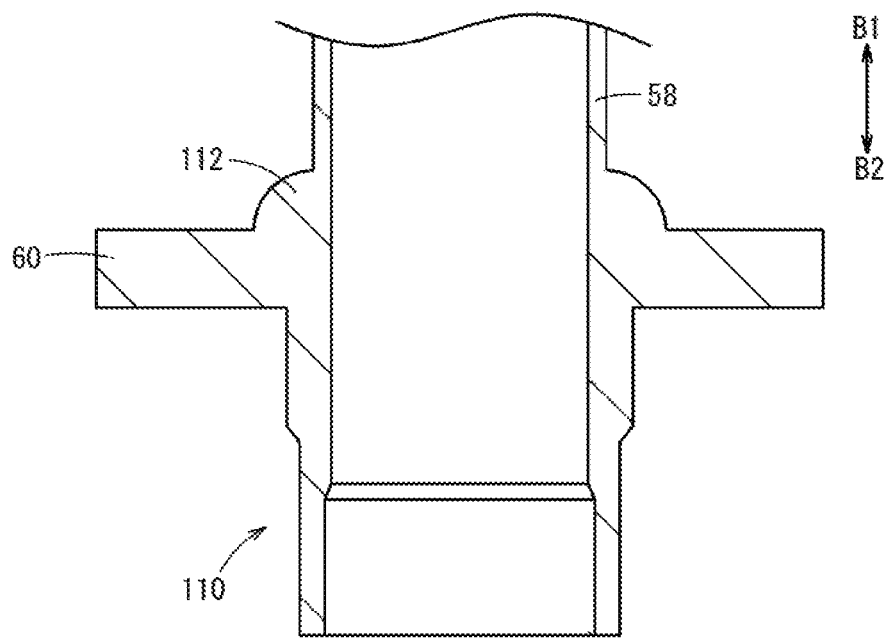
FIG. 4B is an enlarged cross sectional view showing a core housing according to a second modification of the embodiment.

The thick portion 64 provided on the flange part 60 of the core housing 50 is not limited to the above-described case where the thick portion 64 has a triangular shape in cross section, and the thickness of the thick portion 64 is gradually increased toward the guide part 58. For example, as shown in FIG. 4A, a thick portion 102 of a core housing 100 may be provided that protrudes from the flange part with a rectangular shape in cross section. Alternatively, as shown in FIG. 4B, a thick portion 112 of a core housing 110 may be provided that protrudes from the flange part with a circular-arc shape in cross section.

That is, in the flange part 60, the shape of the thick portion is not limited particularly to the above shapes as long as the thick portion is formed adjacent to the guide part 58 and has a shape to make it possible to alleviate concentration of the magnetic flux.

The solenoid valve according to the present invention is not limited to the above described embodiments. It is a matter of course that various structures can be adopted without deviating from the scope of the present invention.

What is claimed is:

1. A solenoid valve comprising:
a body including a flow channel as a passage of fluid;
a movable core provided movably relative to the body;
a solenoid coupled to the body, and configured to move the movable core in an axial direction when the solenoid is excited by energization;
a fixed member provided inside the solenoid, and made of magnetic material; and
a valve plug provided at an end of the movable core, and configured to switch a communication state of the flow channel,
wherein the fixed member includes:
a tubular guide part in which the movable core is movably accommodated;
a core part extending coaxially with and continuous with the guide part, the core part being configured to attract the movable core by excitation of the solenoid; and
a flange part expanded radially outwardly from the guide part,
wherein a thick portion is provided on a boundary portion between the flange part and the guide part,
wherein the thick portion has a rectangular cross-sectional shape or circular-arc cross-sectional shape,
wherein the rectangular cross-sectional shape or the circular-arc cross-sectional shape does not include a further projection in cross-section,
wherein the flange part abuts against a sealing member provided at an insertion part of the body, for preventing the fluid from leaking out, and
wherein the movable core is disposed within a cavity in the fixed member, the movable core and the cavity both being cylindrical.

2. The solenoid valve according to claim 1, wherein the thick portion is formed on a side of the core part of the guide part so as to be thicker in an axial direction than an outer marginal portion of the flange part, the thick portion being disposed radially inward of the outer marginal portion.

3. The solenoid valve according to claim 1, wherein the fixed member is formed by cutting a single material.

4. The solenoid valve according to claim 1,
wherein the cavity in the fixed member is open on one end, and
wherein a lowermost part of the fixed member is below a lowermost part of the movable core.

* * * * *